United States Patent
Smyth et al.

(10) Patent No.: US 8,117,302 B2
(45) Date of Patent: Feb. 14, 2012

(54) BUDDY LIST PRUNING FOR INSTANT MESSAGING SYSTEM PERFORMANCE ENHANCEMENT

(75) Inventors: Hugh Smyth, Dublin (IE); David P. Curley, Georgetown, MA (US); Patrick O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 11/556,402

(22) Filed: Nov. 3, 2006

(65) Prior Publication Data

US 2008/0126532 A1 May 29, 2008

(51) Int. Cl.
*G06F 15/173* (2006.01)
(52) U.S. Cl. .................. 709/224; 709/204; 709/206
(58) Field of Classification Search .................. 709/204, 709/206, 224
See application file for complete search history.

(56) References Cited

U.S. PATENT DOCUMENTS

| | | | |
|---|---|---|---|
| 6,750,881 B1 * | 6/2004 | Appelman | 715/733 |
| 2004/0153506 A1 | 8/2004 | Ito et al. | |
| 2004/0172455 A1 * | 9/2004 | Green et al. | 709/207 |
| 2004/0196315 A1 * | 10/2004 | Swearingen et al. | 345/804 |
| 2004/0199582 A1 | 10/2004 | Kucharewski et al. | |
| 2004/0234061 A1 * | 11/2004 | Koch et al. | 379/207.02 |
| 2005/0071435 A1 * | 3/2005 | Karstens | 709/207 |
| 2005/0080859 A1 * | 4/2005 | Lake | 709/206 |
| 2005/0198131 A1 | 9/2005 | Appelman et al. | |
| 2005/0246421 A1 | 11/2005 | Moore et al. | |
| 2006/0101119 A1 * | 5/2006 | Qureshi et al. | 709/206 |
| 2006/0123085 A1 * | 6/2006 | Burns et al. | 709/206 |
| 2006/0140361 A1 * | 6/2006 | Heikes et al. | 379/88.22 |
| 2006/0179114 A1 * | 8/2006 | Deeds | 709/206 |
| 2006/0288077 A1 * | 12/2006 | Chen | 709/206 |

OTHER PUBLICATIONS

Balasubramanian et al. (Lotus Instant Messaging and LDAP directory interactions, pp. 1-7, Feb. 17, 2004).*

* cited by examiner

*Primary Examiner* — Wing Chan
*Assistant Examiner* — Hitesh Patel
(74) *Attorney, Agent, or Firm* — Steven M. Greenberg, Esq.; Carey, Rodriquez, Greenberg & O'Keefe

(57) ABSTRACT

A method, system and computer program product for buddy list pruning for instant messaging system performance enhancement. In one embodiment of the invention, a buddy list pruning method for instant messaging system performance enhancement can include comparing buddy list name entries in a buddy list to entries in a network directory used to authenticate users into a network supporting the instant messaging system. The method further can include characterizing selected ones of the buddy list name entries as either invalid where a buddy list name entry cannot be matched to an entry in the network directory, or as valid where the buddy list name entry can be matched to an entry in the network directory. Finally, the method can include performing presence awareness only on valid buddy list name entries in the buddy list.

15 Claims, 2 Drawing Sheets

BUDDY LIST PRUNING FOR INSTANT MESSAGING SYSTEM PERFORMANCE ENHANCEMENT

BACKGROUND OF THE INVENTION

1. Field of the Invention

The present invention relates to the field of instant messaging and more particularly to buddy list management for instant messaging systems.

2. Description of the Related Art

Real time communications systems provide a substantial enhancement over more traditional, asynchronous communications systems. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications systems lack several elements common in the realm of real time communications systems. In particular, the seemingly instant delivery of a message cannot be experienced in the world of electronic mail. In a real-time society, the minor latencies associated with electronic mail often cannot be suitable for the task at hand where a real-time conversation will be required in addressing a problem or performing a collaborative task. More importantly, often the feel and nature of a "conversation" as it is known to human beings only can be approximated through real time communications where the participants to a conversation feel the spontaneity of an exchange of ideas, much as is the case in a live, face-to-face conversation.

The recent rapid development of the Internet has led to advanced modes of synchronous, real-time collaboration able to fulfill the real-time communicative requirements of the modern computing participant. Using the Internet as a backbone, individuals worldwide can converge in real-time in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include several human-to-human collaborative environments including instant messaging.

In an instant messaging system, commonly used addresses for collaborative partners are stored and maintained in an address book referred to as a "buddy list". New entries generally are added to the buddy list in only one of two ways: manually, or in response to receiving a chat request from another party. In either circumstance, however, the establishment of a subsequent conversation with the same collaborator can be as simple as locating the address of the collaborator in the buddy list and requesting the initiation of an instant messaging session with the collaborator.

Presence awareness for an instant messaging system provides for an indication of whether or not a collaborator is on-line, off-line, on-line, but unavailable, or on-line and available, to name a few presence states. Generally, presence awareness is applied to buddy lists so that the availability of any particular collaborator to chat can be readily apparent merely by glancing at the buddy list. To implement presence awareness for a buddy list, at log on time, the buddy list can be forwarded to the instant messaging server and placed into an array. As individual collaborators become available, the instant messaging server can change the presence state of a corresponding in the buddy list to available.

Within an organization, users come and go. As new users are added to an organization, those users are added to the network directory, and as existing users leave an organization, those users are removed from the network directory. The directory itself provides the principal indicator as to those users which are permitted to access the organizational network resources. The presence or absence of a buddy list entry for a current or former user, however, remains independent of the presence or absence of a corresponding user entry in the network directory.

To wit, as users are removed from the network directory, the corresponding buddy list entry will remain in the buddy list as an invalid entry. To the viewer of the buddy list, however, the invalid buddy will appear to be perpetually off-line. Notwithstanding, server resources will continue to be consumed when attempting presence awareness for the invalid buddy in the buddy list. For a large organization, the impact of wasted resources due to invalid entries among buddy lists can be substantial.

BRIEF SUMMARY OF THE INVENTION

Embodiments of the present invention address deficiencies of the art in respect to buddy list management for instant messaging systems and provide a novel and non-obvious method, system and computer program product for buddy list pruning for instant messaging system performance enhancement. In one embodiment of the invention, a buddy list pruning method for instant messaging system performance enhancement can include comparing buddy list name entries in a buddy list to entries in a network directory used to authenticate users into a network supporting the instant messaging system. The method further can include characterizing selected ones of the buddy list name entries as either invalid where a buddy list name entry cannot be matched to an entry in the network directory, or as valid where the buddy list name entry can be matched to an entry in the network directory. Finally, the method can include performing presence awareness only on valid buddy list name entries in the buddy list.

In one aspect of the embodiment, the method further can include marking invalid buddy list entries in the buddy list. In another aspect of the embodiment, the method further can include deleting invalid buddy list entries from the buddy list. In yet another aspect of the embodiment, the method further can include moving invalid buddy list entries from the buddy list into a trash folder. Notably, the method even yet further can include characterizing selected ones of the buddy list name entries as either invalid or valid periodically on a schedule, or manually on command.

In another embodiment of the invention, an instant messaging data processing system for a network environment can be provided. The system can include an instant messaging server configured for coupling to instant messaging clients and to a network directory storing entries associated with authorized users of the network environment. The system also can include presence awareness coupled to the instant messaging server. Finally, the system can include buddy list pruning logic coupled to the instant messaging server. The buddy list pruning logic can include program code enabled to compare buddy list name entries in buddy lists for corresponding ones of the instant messaging clients to entries in the network directory to identify invalid ones of the buddy list name entries. Optionally, the system can include a valid cache and an invalid cache, the valid cache storing buddy list names found to be valid and by the buddy list pruning logic, and the invalid cache storing buddy list names found to be invalid by the buddy list pruning logic.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for buddy list pruning for instant messaging system performance enhancement. In accordance with an embodiment of the present invention, name entries in a buddy list can be compared to a list of users in a network directory. Buddy list name entries matching a user in the network directory can be determined to be valid buddy list name entries, while buddy list entries failing to match a user in the network directory can be determined to be invalid buddy list name entries. Once a buddy list name entry is determined to be invalid, the end user can be so notified and presence awareness can bypass the invalid buddy list name entries. In this way, computing resources associated with applying presence awareness to invalid buddy list entries need not be needlessly consumed.

Figure 1:
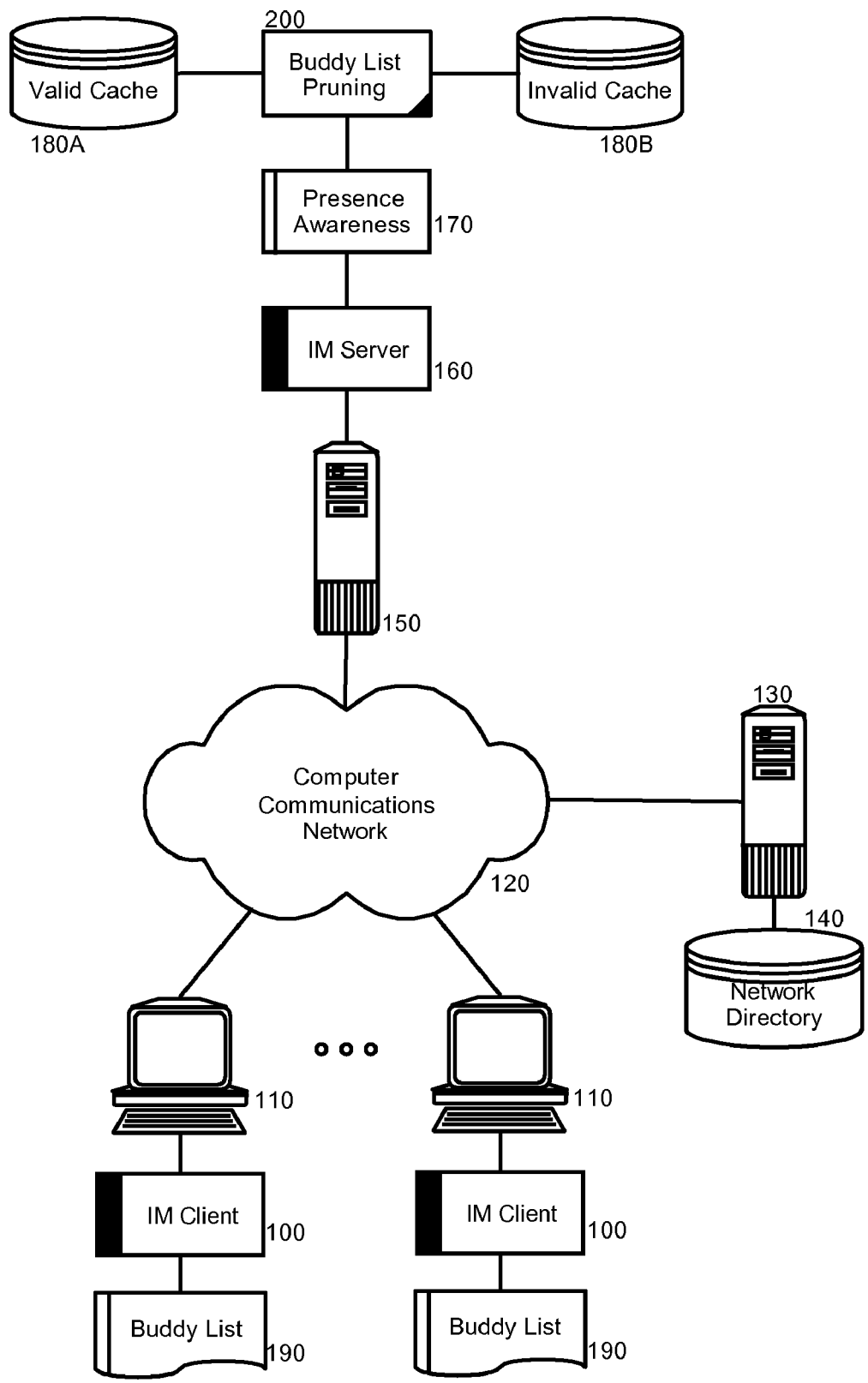
FIG. 1 is a schematic illustration of an instant messaging data processing system configure for buddy list pruning for instant messaging system performance enhancement; and, FIG. 2 is a flow chart illustrating a process for buddy list pruning for instant messaging system performance enhancement.

In further illustration, FIG. 1 is a schematic illustration of an instant messaging data processing system configure for buddy list pruning for instant messaging system performance enhancement. The system can include a network environment defined by one or more client computing platforms 110 communicatively coupled to one another via a network server platform 130 over a computer communications network 130. The network server platform 130 can include a network directory 140 storing user identities permitted to access the network environment. In this way, users can authenticate into the network environment by providing credentials suitable to be compared to credentials disposed in the network directory 140 so as to authorize access to the network environment.

Each of the client computing platforms 110 further can be coupled to a host computing platform 150 supporting the operation of an instant messaging server 160. Correspondingly, each of the client computing platforms 110 can support the operation of an instant messaging client 100 thereby providing an instant messaging community among the client computing platforms 110. The instant messaging server 160 can include presence awareness 170 for buddy list name entries disposed in respective buddy lists 190 for the different instant messaging clients 100. In this regard, presence awareness 170 can determine for each of the instant messaging clients 100 whether or not a user associated with the buddy list name in a corresponding one of the buddy lists 190 is present and available to engage in an instant messaging session.

In further illustration, FIG. 1 is a schematic illustration of an instant messaging data processing system configure for buddy list pruning for instant messaging system performance enhancement. The system can include a network environment defined by one or more client computing platforms 110 communicatively coupled to one another via a network server platform 130 over a computer communications network 130. The network server platform 120 can include a network directory 140 storing user identities permitted to access the network environment. In this way, users can authenticate into the network environment by providing credentials suitable to be compared to credentials disposed in the network directory 140 so as to authorize access to the network environment.

During pruning, a buddy list name entry in a particular one of the buddy lists 190 can be compared to the buddy list name entries in the valid cache 180A and the invalid cache 180B. To the extent that a buddy list name entry is determined to be invalid by virtue of its presence in the invalid cache 180B, the end user can be so notified, through an annotation of the invalid buddy list name entry in respective ones of the buddy lists 190. Alternatively, the invalid buddy list name entry can be removed from the respective ones of the buddy lists 190. As yet another alternative, the invalid buddy list name entry can be removed in each respective one of the buddy lists 190 to a trash folder of invalid buddy list name entries for review by the end user. In the latter two instances, presence awareness 170 need not consider invalid buddy list name entries when performing presence awareness for the buddy lists 190.

Figure 2:
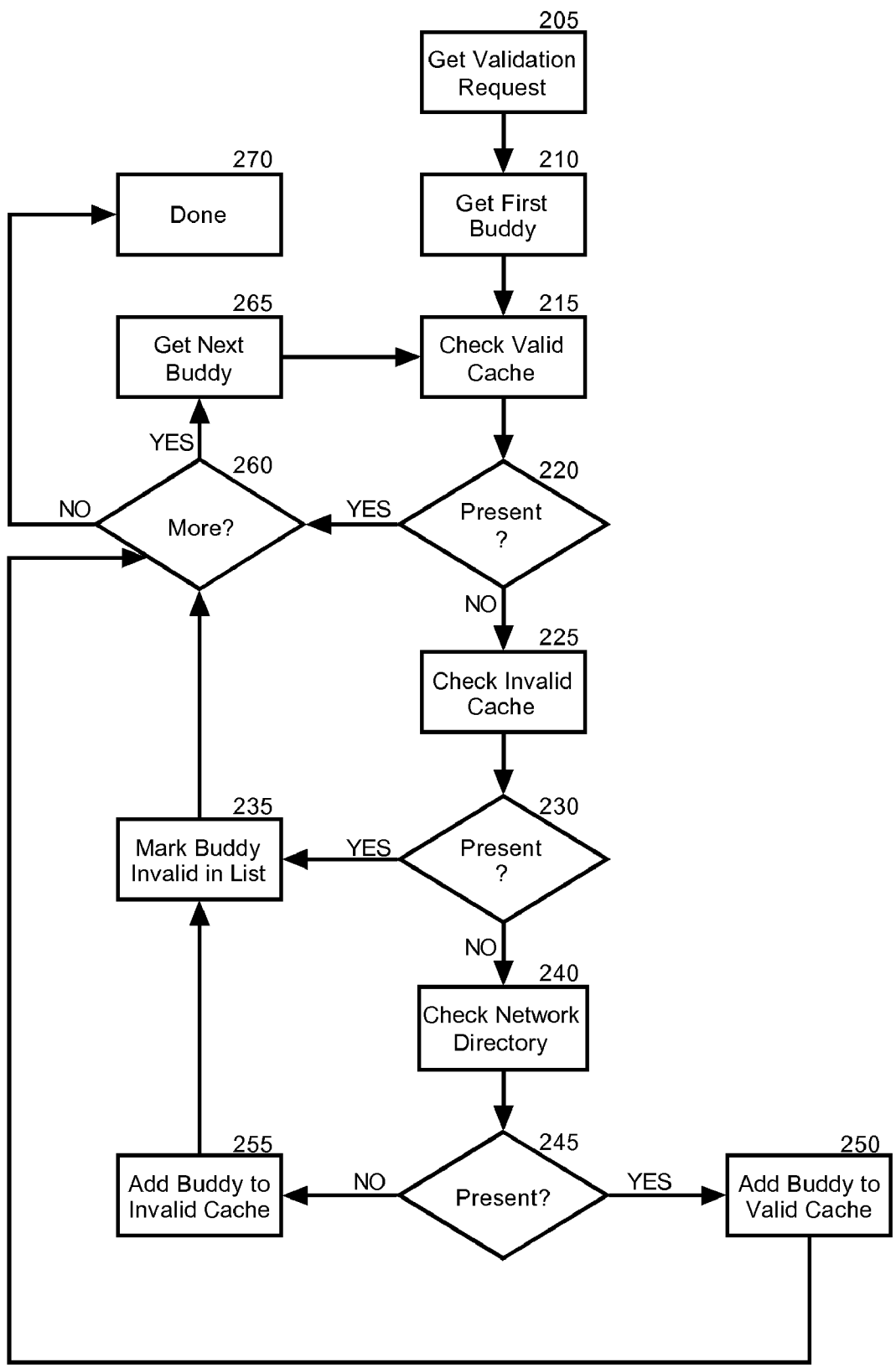

In yet further illustration, FIG. 2 is a flow chart illustrating a process for buddy list pruning for instant messaging system performance enhancement. Beginning in block 205, a validation request can be received for an instant messaging system. The validation request can be manually applied, or automatically applied either in response to the occurrence of an event, or on the basis of a schedule. In any case, in block 210, a first buddy list name entry can be retrieved for consideration and, in block 215 the valid cache can be checked for the presence of the buddy list name entry. In decision block 220, if the buddy list name entry is determined to exist in the valid cache, the process can continue through decision block 260. Otherwise the process can continue through block 225.

In block 260, in that the buddy list name entry is found to exist in the valid cache, the buddy list name entry can be presumed valid and it can be determined if additional buddy list name entries remain to be considered. If so, the next buddy list name entry in the buddy list can be retrieved for consideration. Otherwise the process can end in block 270.

Returning to block 220, if it is determined that the buddy list name entry is not present in the valid cache, in block 225 the invalid cache can be checked for the presence of the buddy list name entry. In decision block 230, if the buddy list name entry is present in the invalid cache, in block 235 the buddy list name entry can be marked invalid in the buddy list and the process can continue through decision block 260. On the other hand, in decision block 230 if the buddy list name entry is determined not to be present in the invalid cache, in block 240 the network directory can be checked for the presence of the buddy list name entry.

In block 260, in that the buddy list name entry is found to exist in the valid cache, the buddy list name entry can be presumed valid and it can be determined if additional buddy list name entries remain to be considered. If so, in block 265, the next buddy list name entry in the buddy list can be retrieved for consideration. Otherwise the process can end in block 270.

Notably, the foregoing process can be applied to each buddy list in the instant messaging system. In consequence, the buddy list name entries in the buddy lists can be classified either as valid or invalid. The invalid buddy list name entries can be removed from the respective buddy lists either manually or automatically. In consequence, presence awareness need only consume computing resources to determine presence for valid buddy list name entries resulting in performance enhancements for the instant messaging system.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer-implemented buddy list pruning method, using a computer hardware system, for instant messaging system performance enhancement, the method comprising: comparing, using the computer hardware system, buddy list name entries in a buddy list to entries in a network directory used to authenticate users into a network supporting the instant messaging system; characterizing, using the computer hardware system, selected ones of the buddy list name entries as either invalid where a buddy list name entry cannot be matched to an entry in the network directory, or valid where the buddy list name entry can be matched to an entry in the network directory; performing, using the computer hardware system, presence awareness only on valid buddy list name entries in the buddy list; storing valid ones of the buddy list name entries in a valid cache; and, storing invalid ones of the buddy list name entries in an invalid cache.

2. The method of claim 1, further comprising marking invalid buddy list entries in the buddy list.

3. The method of claim 1, further comprising deleting invalid buddy list entries from the buddy list.

4. The method of claim 1, further comprising moving invalid buddy list entries from the buddy list into a trash folder.

5. The method of claim 1, further comprising characterizing selected ones of the buddy list name entries as either invalid or valid periodically on a schedule.

6. The method of claim 1, further comprising characterizing selected ones of the buddy list name entries as either invalid or valid manually on command.

7. The method of claim 1, wherein performing presence awareness only on valid buddy list name entries in the buddy list, comprises performing presence awareness only on buddy list name entries in the valid cache.

8. In a network environment, an instant messaging data processing system comprising:
an instant messaging server configured for coupling to a plurality of instant messaging clients and to a network directory storing entries associated with authorized users of the network environment;
presence awareness coupled to the instant messaging server;
buddy list pruning logic coupled to the instant messaging server, the logic comprising program code enabled to compare buddy list name entries in buddy lists for corresponding ones of the instant messaging clients to entries in the network directory to characterize invalid ones of the buddy list name entries;
a valid cache and an invalid cache, the valid cache storing buddy list names found to be valid by the buddy list pruning logic, and the invalid cache storing buddy list names found to be invalid by the buddy list pruning logic.

9. A computer program product comprising a computer usable storage memory having stored therein computer usable program code for buddy list pruning for instant messaging system performance enhancement, the computer usable program code, which when executed by a computer hardware system, causes the computer hardware system to perform: comparing buddy list name entries in a buddy list to entries in a network directory used to authenticate users into a network supporting the instant messaging system; characterizing selected ones of the buddy list name entries as either invalid where a buddy list name entry cannot be matched to an entry in the network directory, or valid where the buddy list name entry can be matched to an entry in the network directory; performing presence awareness only on valid buddy list name entries in the buddy list; storing valid ones of the buddy list name entries in a valid cache; and, storing invalid ones of the buddy list name entries in an invalid cache.

10. The computer program product of claim 9, further comprising marking invalid buddy list entries in the buddy list.

11. The computer program product of claim 9, further comprising deleting invalid buddy list entries from the buddy list.

12. The computer program product of claim 9, further comprising-moving invalid buddy list entries from the buddy list into a trash folder.

13. The computer program product of claim 9, further characterizing selected ones of the buddy list name entries as either invalid or valid periodically on a schedule.

14. The computer program product of claim 9, further comprising characterizing selected ones of the buddy list name entries as either invalid or valid manually on command.

15. A computer program product of claim 9, wherein the performing presence awareness only on valid buddy list name entries in the buddy list, comprises performing presence awareness only on buddy list name entries in the valid cache.

* * * * *